US006885416B2

(12) United States Patent
Luo et al.

(10) Patent No.: US 6,885,416 B2
(45) Date of Patent: Apr. 26, 2005

(54) FLAT PANEL DISPLAY WITH A NON-MATRIX LIGHT SHIELDING STRUCTURE

(75) Inventors: Fang-Chen Luo, Hsinchu (TW); Kuen-Wen Hu, Yungkang (TW)

(73) Assignee: AU Optronics Corp., Hsinchu (TW)

( * ) Notice: Subject to any disclaimer, the term of this patent is extended or adjusted under 35 U.S.C. 154(b) by 98 days.

(21) Appl. No.: 10/615,170

(22) Filed: Jul. 7, 2003

(65) Prior Publication Data

US 2005/0007524 A1 Jan. 13, 2005

(51) Int. Cl.[7] ................................................ G02F 1/13
(52) U.S. Cl. ...................................... 349/110; 349/111
(58) Field of Search ................................ 349/110, 111

(56) References Cited

U.S. PATENT DOCUMENTS

| 5,251,049 A | * | 10/1993 | Sato et al. ................... 349/110 |
| 5,561,440 A | | 10/1996 | Kitajima et al. ............... 345/87 |
| 6,034,749 A | * | 3/2000 | Sato et al. ................... 349/110 |
| 6,064,358 A | | 5/2000 | Kitajima et al. ............... 345/88 |
| 6,297,862 B1 | * | 10/2001 | Murade ....................... 349/110 |
| 6,424,394 B1 | | 7/2002 | Morii ......................... 349/110 |
| 6,556,265 B1 | * | 4/2003 | Murade ....................... 349/111 |
| 6,610,997 B2 | * | 8/2003 | Murade ....................... 349/111 |
| 6,791,647 B1 | * | 9/2004 | Kim et al. ................... 349/110 |
| 2001/0019384 A1 | * | 9/2001 | Murade ....................... 349/110 |

* cited by examiner

Primary Examiner—James A. Dudek
(74) Attorney, Agent, or Firm—Ladas & Parry LLP

(57) ABSTRACT

A flat panel display with a non-matrix shielding structure. The non-matrix shielding structure comprises a main shielding structure which has gaps and main spacings substantially corresponding to the pixel regions, and complementary shielding structures corresponding to the gaps. Each gap substantially corresponds to the scan line or signal line. Each main spacing is connected to at least one of the gaps, and each gap is connected to two adjacent main spacings.

24 Claims, 22 Drawing Sheets

FLAT PANEL DISPLAY WITH A NON-MATRIX LIGHT SHIELDING STRUCTURE

BACKGROUND OF THE INVENTION

1. Field of the Invention

The present invention relates in general to a flat panel display (FPD). In particular, the present invention relates to a liquid crystal display (LCD) with a non-matrix light shielding structure.

2. Description of the Related Art

Liquid crystal displays (LCDs) are a well-known form of flat panel display with advantages of low power consumption, light weight, thin profile, and low driving voltage. Generally, in LCDs, a liquid crystal layer is disposed between two transparent substrates such as glass substrates, and one of the two transparent substrates is provided with switching devices, such as thin film transistors (TFTs). In the display area of the LCD, an array of pixel areas is defined by horizontally extended scan lines and vertically extended signal lines. Each pixel area has a thin film transistor and a pixel electrode.

FIG. 19 is a cross section showing a conventional thin film transistor liquid crystal display (TFT LCD). In the lower substrate, an etch stopper inverse staggered type thin film transistor 15 is disposed on a portion of a lower glass substrate 1 and a pixel electrode 8 made of ITO is disposed on the other portion of the lower glass substrate 1. A passivation layer 9 for protecting the TFT 15 is arranged on the TFT 15. The TFT 15 has a gate 2a, a source 7a and a drain 7b. An insulating layer 3 is disposed between the pixel electrode 8 and storage electrode 2b to a form a capacitor 17. Numeral 4 indicates an active region, numeral 5 indicates an etch stopper and numeral 6 indicates an ohmic resistance contact layer.

In the upper substrate, a black matrix 12 is disposed on a portion of the upper glass substrate 11. The color filter layer 13 of red, green, and blue is disposed on another portion of the upper substrate corresponding to the pixel electrode. A common electrode 14 made of ITO is arranged on the black matrix 12 and the color filter 13.

U.S. Pat. Nos. 5,561,440 and 6,064,358 issued to Masaaki et al. on Oct. 1, 1996 and May 16, 2000 respectively, teaches that the light shielding structure disposed on the upper glass substrate has openings arranged in a matrix and is aligned with the TFT array on the lower glass substrate with each pixel electrode aligned with the opening in the light shielding structure and the edges of each pixel electrode are overlapped by the periphery of the light shielding structure. U.S. Pat. No. 6,424,394 issued to Morii on Jul. 23, 2002 teaches that the shape of the light shielding film is grid-shaped so as to transmit the light. As shown in FIG. 20, the black matrix 12, i.e., a light shielding portion in a grid-shaped pattern is shown with hatching, and the aperture portion 18, i.e., a light transparent portion is shown with white painting. The black matrix 12 shapes the periphery of the display portion of each color picture element of the primary colors R, G and B, adjacent to each other of a color filter 13 to prevent bleeding of each color, such that color mixture is thereby prevented. The black matrix 12 is commonly used to improve the contrast of the color display and to increase the display quality.

However, the black matrix 12 consisting of Cr on the upper substrate is subject to great stress due to the thermal expansion coefficient difference between the black matrix and the glass substrate and between the black matrix and the color filter when forming the upper substrate. The R, G, and B color filter may peel due to the stress induced by the thermal cycles required to manufacture the upper substrate and to be released from the black matrix.

SUMMARY OF THE INVENTION

To solve the above problems, it is an object of the present invention to provide a flat panel display to prevent the R, G and B color filter from peeling.

It is another object of the present invention to provide a flat panel display with reduced stress from the light shielding structure.

The present invention provides a flat panel display with a non-matrix light shielding structure. The non-matrix light shielding structure comprises a main shielding structure which has main spacings substantially corresponding to the pixel regions and gaps, and complementary shielding structures corresponding to the gaps. Each gap substantially corresponds to the scan line or signal line. Each main spacing is connected to at least one of the gaps, and each gap is connected to two adjacent main spacings.

The present invention provides a flat panel display, in which a liquid crystal layer is disposed between first and second substrates. The first substrate includes scan lines and signal lines intersecting to define pixel regions, pixel electrodes disposed in the pixel regions, stripe-shaped shielding layers disposed between the signal lines and the pixel electrodes and overlapping the pixel electrodes, and complementary shielding structures. The second substrate includes a main shielding structure having gaps and main spacings substantially corresponding to the pixel regions, and a color filter disposed on the main shielding structure. Each gap substantially corresponds to one of the scan lines or signal lines, each main spacing is connected to at least one of the gaps, and each gap is connected to two adjacent main spacings. The complementary shielding structures correspond to the gaps.

The present invention provides a flat panel display. Within a pixel unit, first and second scan lines are parallel to each other in a first direction; first and second signal lines are parallel to each other in a second direction, wherein the first and second scan lines and the first and second signal lines define a pixel region. A main shielding structure having a main spacing and a gap, in which the main spacing substantially corresponds to the pixel region and the gap is connected to the main spacing and an adjacent main spacing. A complementary shielding structure is disposed under the gap to partially overlap the main shielding structure.

BRIEF DESCRIPTION OF THE DRAWINGS

The preferred embodiment of the invention is hereinafter described with reference to the accompanying drawings in which.

DETAILED DESCRIPTION OF THE INVENTION

Figure 1:
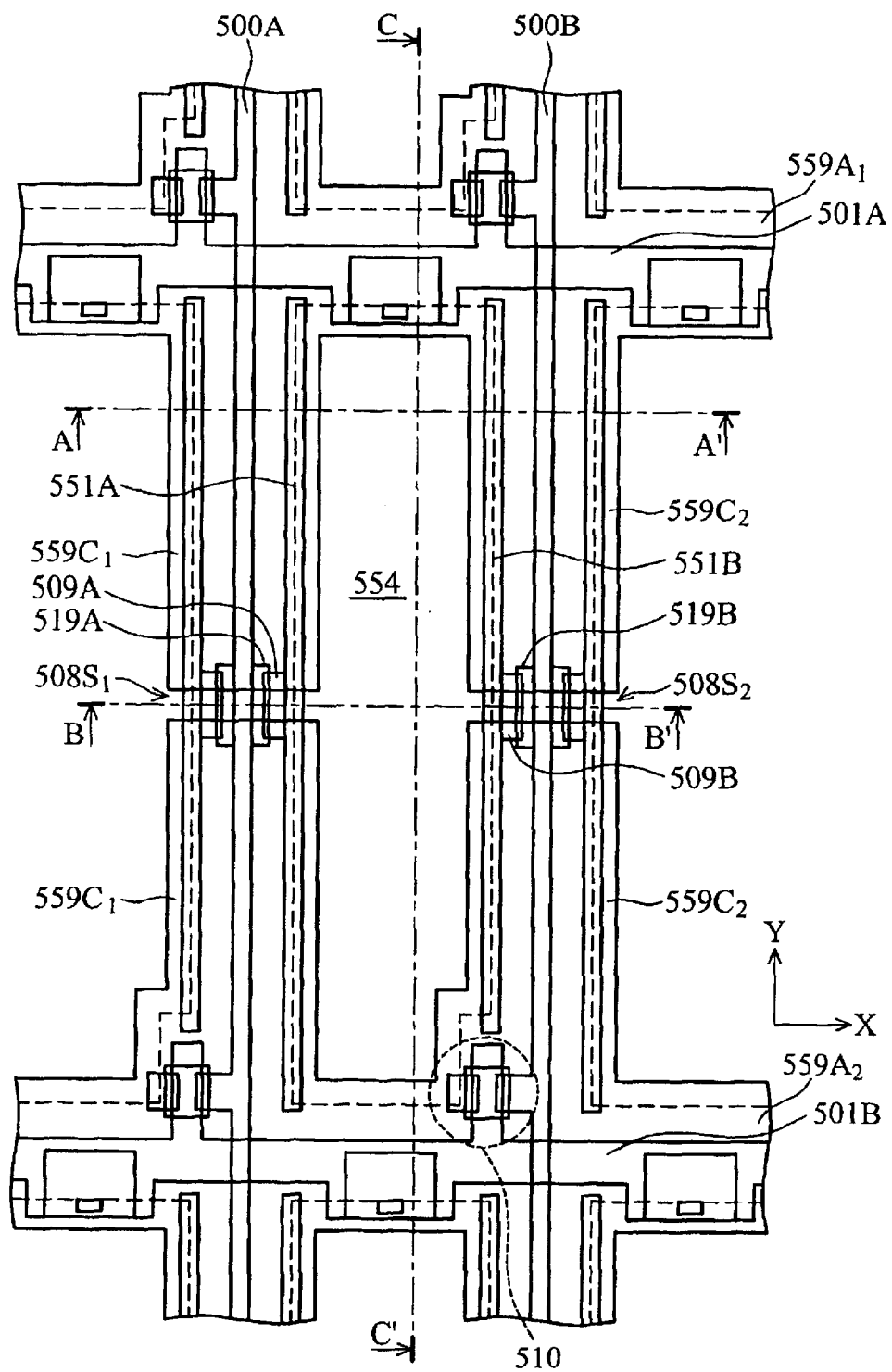
FIG. 1 is a plane view of a pixel region of a liquid crystal display according to the first embodiment of the present invention.

In order to reduce the stress from the light shielding structure while fabricating the upper substrate, the present invention provides a non-matrix light shielding structure. The liquid crystal display apparatus (liquid crystal panel) to which the present invention is applied are not particularly limited. The display can be of a reflective, transmissive, projective or transflective type, and the driving element formed on each pixel which is a minimum display unit can be a thin film transistor (TFT), a metal insulator metal (MIM), or similar, in order to provide improved image quality and superior resolution in the display.

Before explaining the light shielding structure of a liquid crystal display apparatus according to the present invention, an explanation will be made of the general structure of the liquid crystal display apparatus to which the present invention is applied referring to the drawings.

First Embodiment

In the first embodiment a specific example of a transmissive type liquid crystal display with TFTs as the driving element is given, and a detailed description is given hereinafter.

Figure 2A:
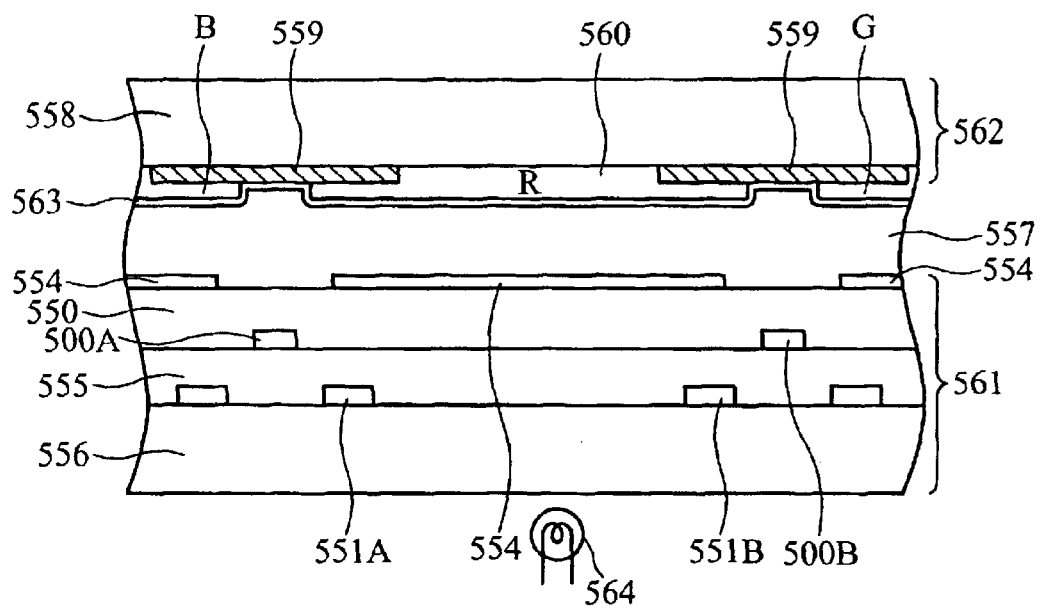
FIG. 2A is a cross section taken along cut line A-A' of FIG. 1.
Figure 2B:
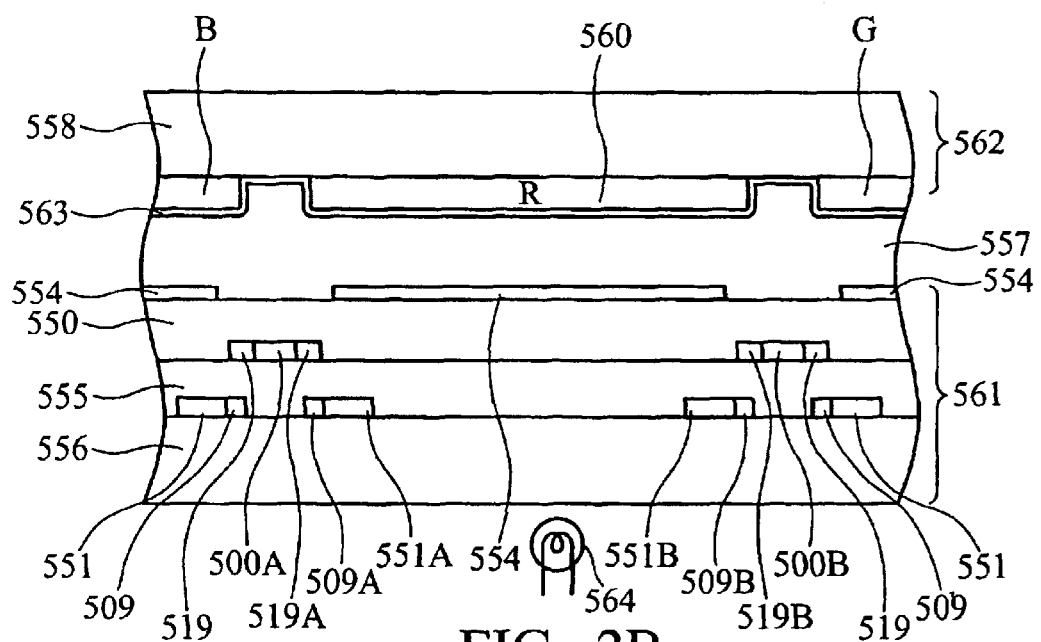
FIG. 2B is a cross section taken along cut line B-B' of FIG. 1.
Figure 2C:
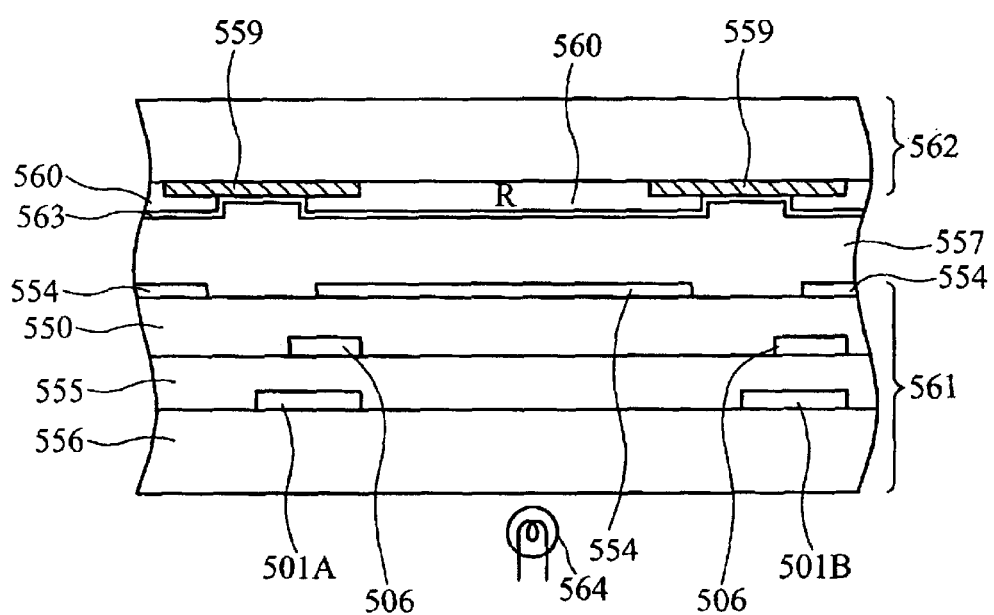
FIG. 2C is a cross section taken along cut line C-C' of FIG. 1.
Figure 5:
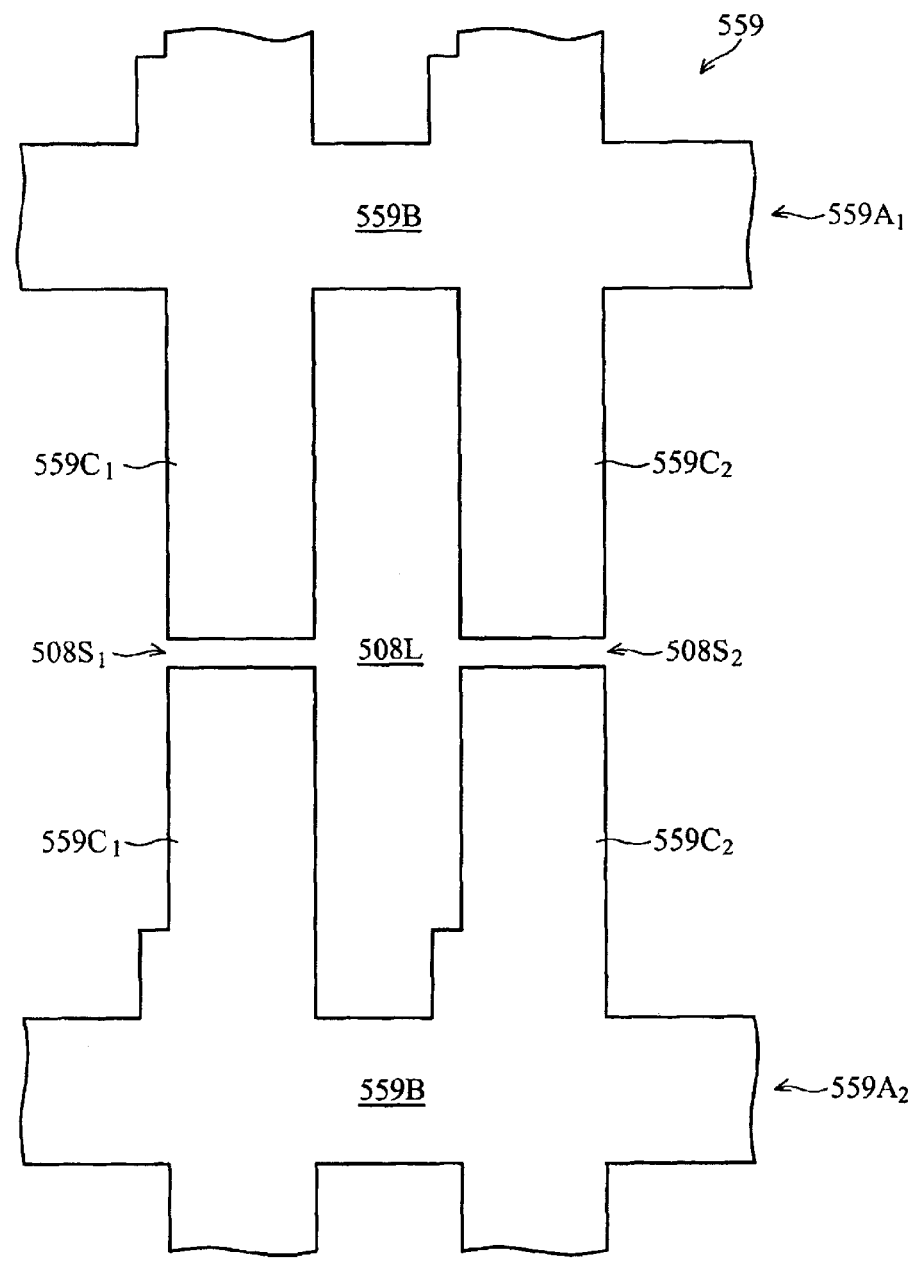
FIG. 5 is a plane view showing the main shielding structure, i.e. fishbone-shaped shielding elements disposed on an upper transparent substrate in the pixel region of FIG. 1.

FIG. 1 is a plane view of a pixel region of a liquid crystal display according to the first embodiment of the present invention. FIGS. 2A, 2B and 2C are cross sections taken along cut line A-A', B-B' and C-C' of FIG. 1, respectively. FIG. 5 is a plane view showing a main shielding structure disposed on an upper transparent substrate in the pixel region of FIG. 1.

Figure 3:
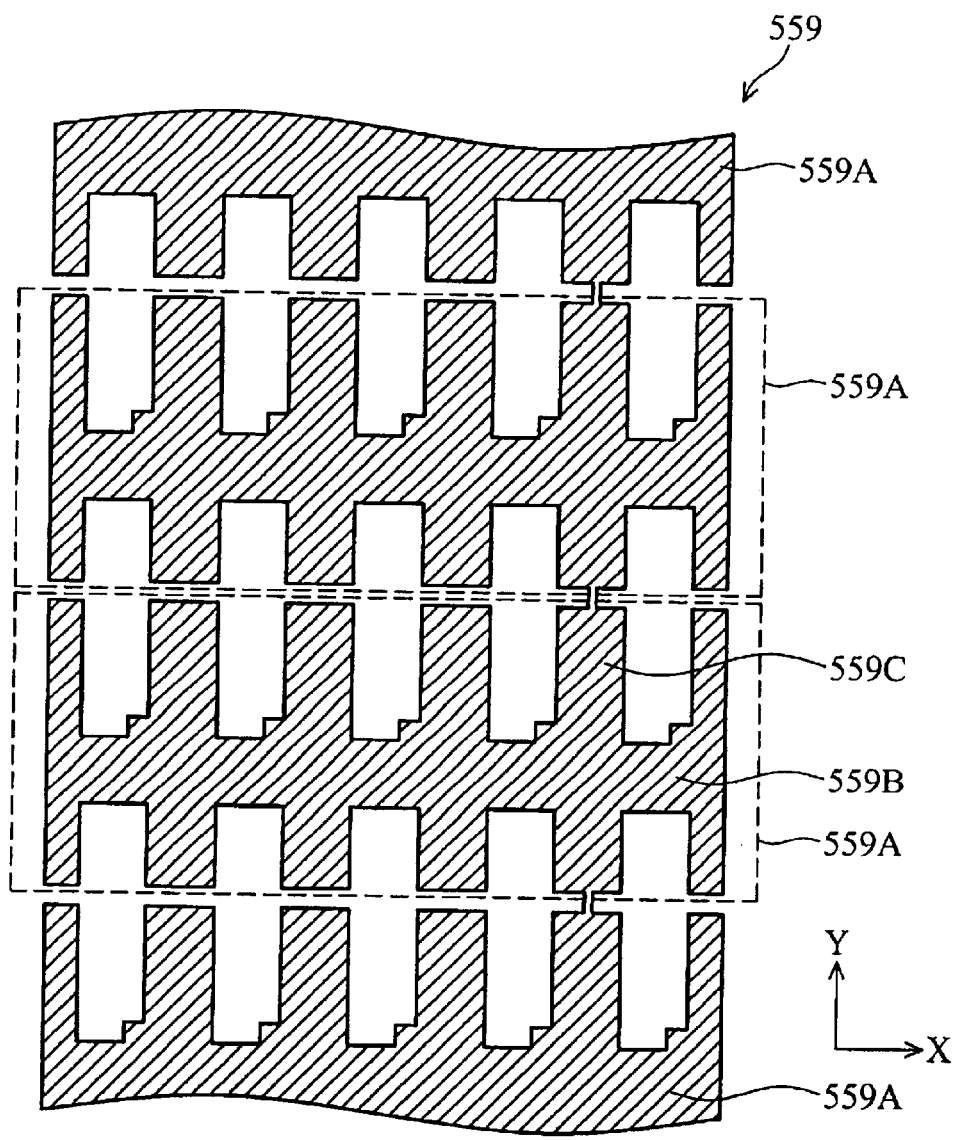
FIG. 3 is a plane view of fishbone-shaped shielding elements on an upper substrate for multiple adjacent display pixels according to the first embodiment of the present invention.
Figure 4:
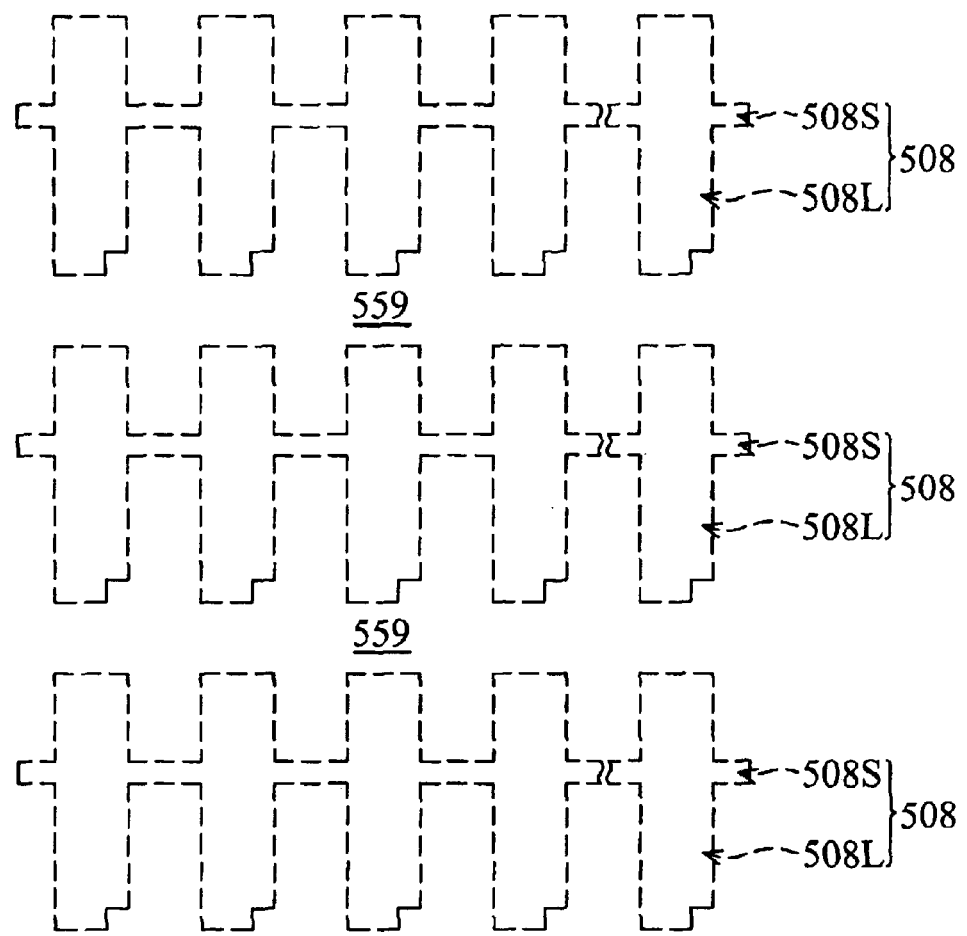
FIG. 4 is a plane view of fishbone-shaped spacings between the fishbone-shaped layers for multiple adjacent display pixels.

FIG. 3 is a plane view of fishbone-shaped shielding elements on an upper substrate for multiple adjacent display pixels, and FIG. 4 is a plane view of fishbone-shaped spacing between the fishbone-shaped shielding elements for multiple adjacent display pixels.

As shown in FIGS. 2A–2C, the liquid crystal display comprises an upper substrate 562, a lower substrate 561 and a liquid crystal 557 sealed in a space between the upper substrate 562 and the lower substrate 561. An illumination source 564 is placed behind the lower substrate 561.

As shown in FIGS. 1 and 2A–2C, for one pixel area the lower substrate 561 comprises a lower transparent substrate 556, a TFT 510, scan lines 501A and 501B extending in direction X, signal lines 500A and 500B extending in direction Y, a pixel electrode 554 as shown with dashed line, stripe-shaped shielding layers 551A and 551B and complementary shielding layers 509A, 509B, 519A and 519B. The scan lines 501A and 501B and the signal lines 500A and 500B define a pixel area, and a pixel electrode 554 shown in FIG. 1 with dashed line is formed in the main portion of the pixel area. The pixel electrode 554 is controlled by the TFT 510 which is formed substantially with the scan line 501B and the signal line 500B at one corner of the pixel area.

Figure 8:
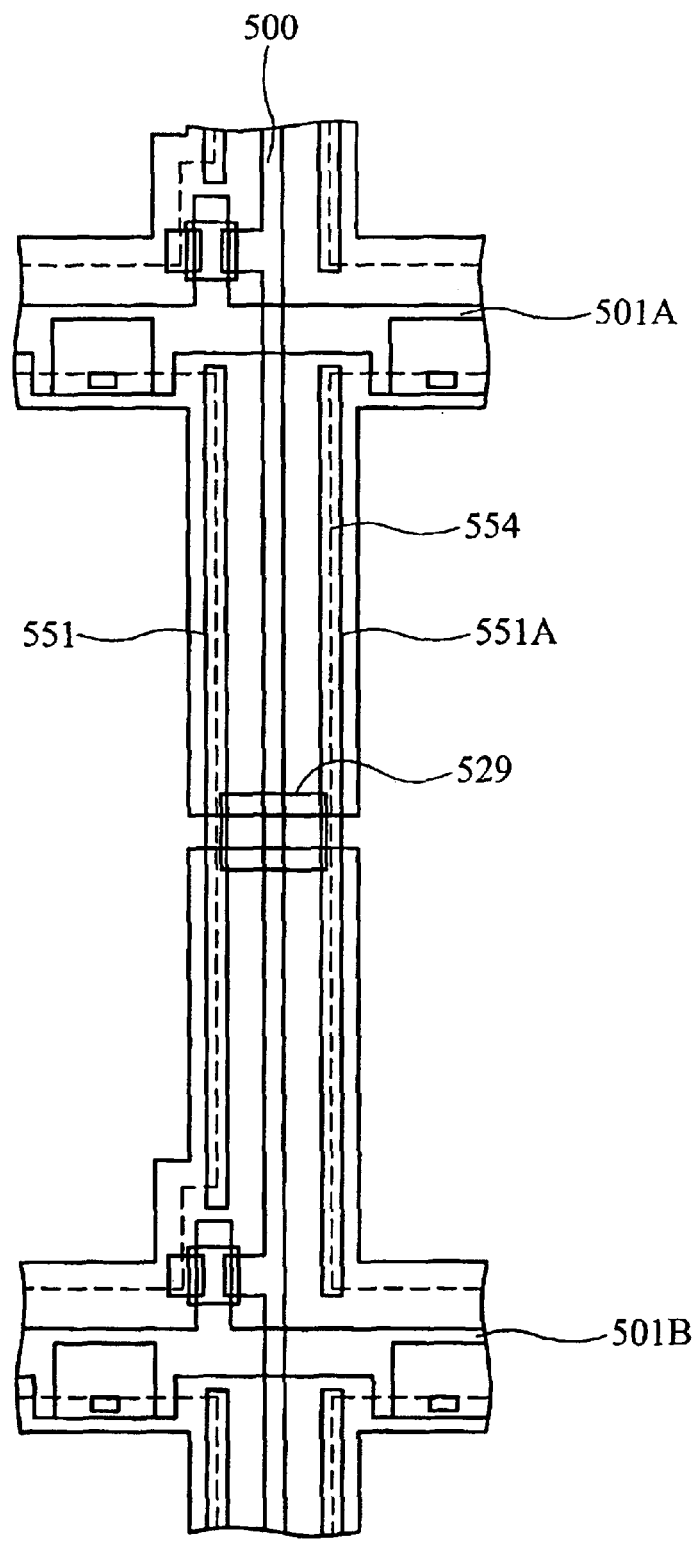
FIG. 8 is a plane view showing only parts of the light shielding structure including two fishbone-shaped shielding elements and a complementary shielding structure which is an isolated shielding structure overlapping the stripe shielding layers and the signal line.
Figure 9:
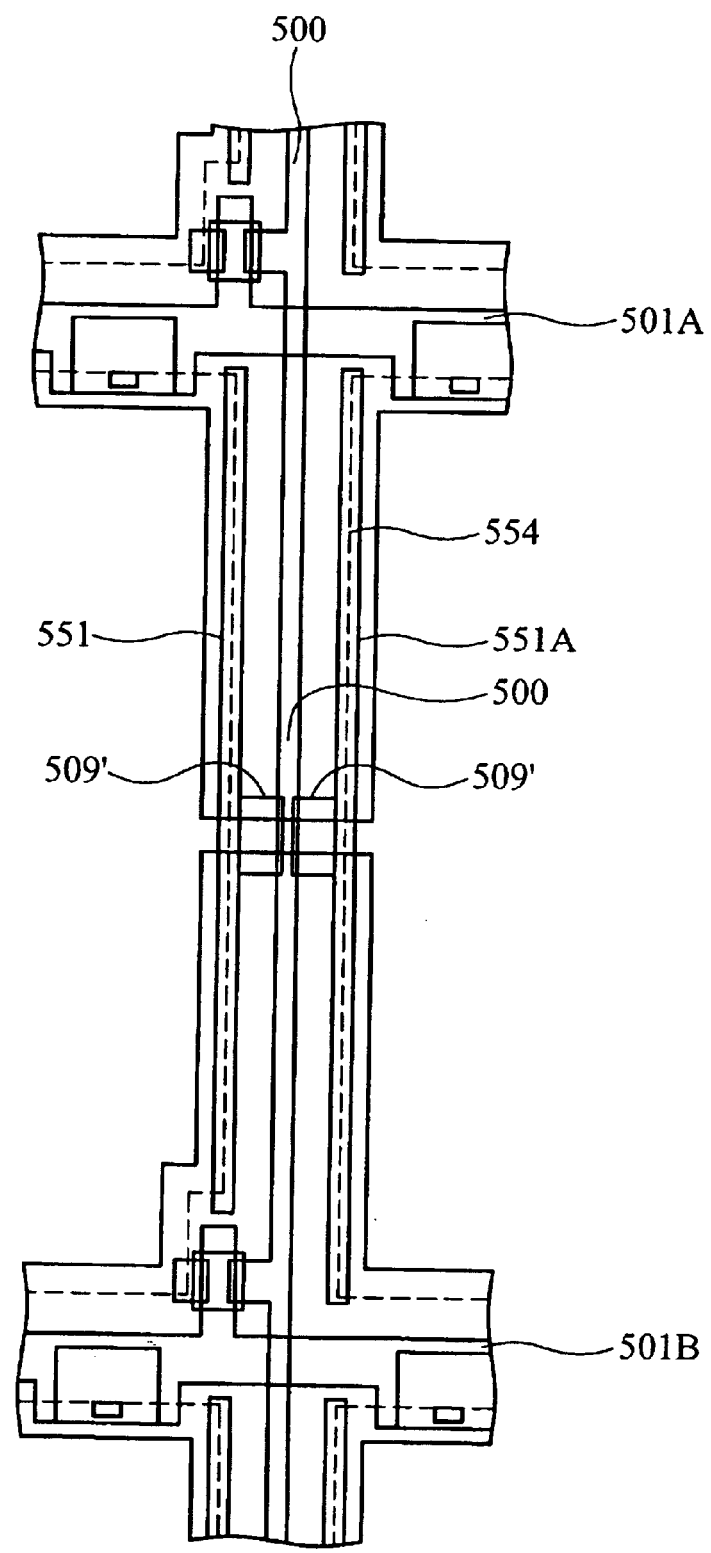
FIG. 9 is a plane view showing only parts of the light shielding structure including two fishbone-shaped shielding elements and a complementary shielding structure overlapping the signal line and contacting the stripe shielding layer.
Figure 10:
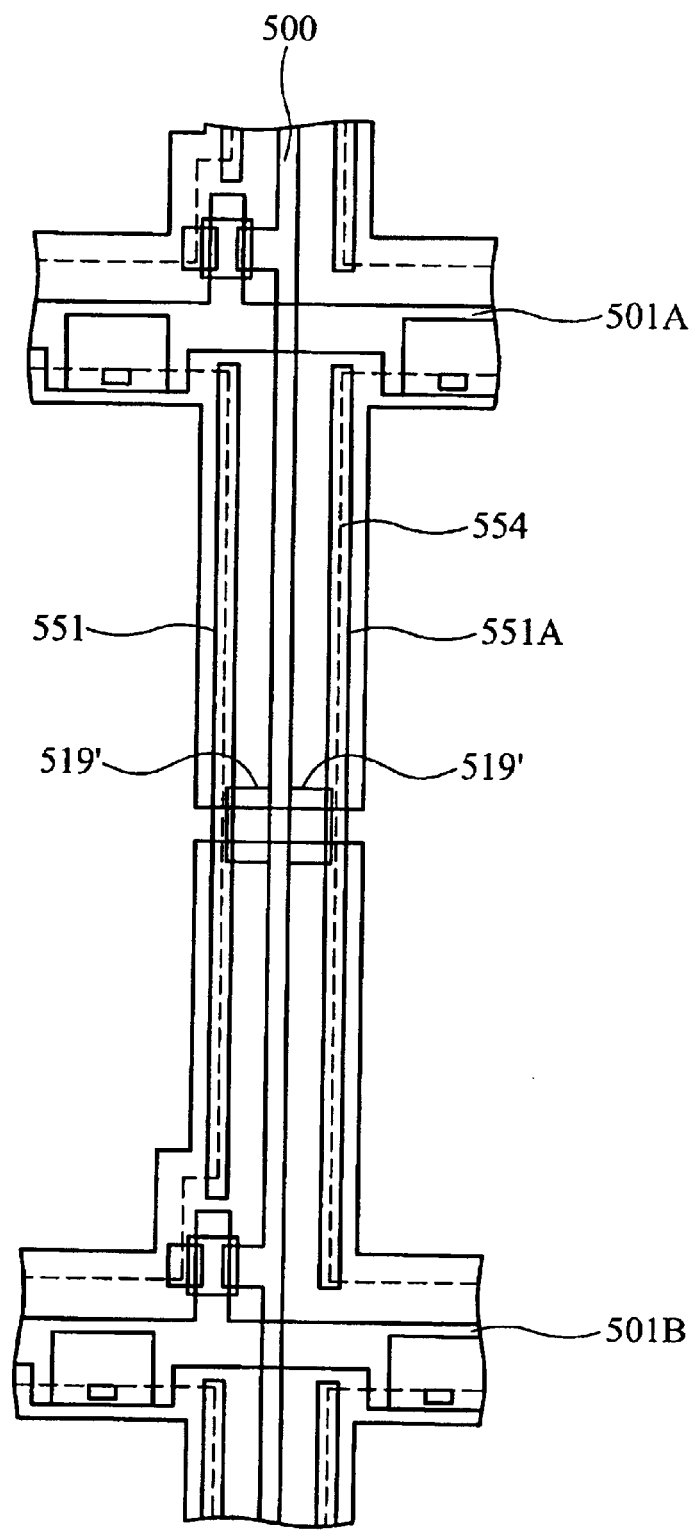
FIG. 10 is a plane view showing only parts of the light shielding structure including two fishbone-shaped shielding elements and a complementary shielding structure overlapping the stripe shielding layer and contacting the signal line.

As for the lower substrate 561, the left stripe shielding layer 551A is formed between the left signal line 500A and the pixel electrode 554 to partially overlap the periphery of the pixel electrode 554. Also, the right stripe shielding layer 551B is formed between the right signal line 500B and the pixel electrode 554 to partially overlap the periphery of the pixel electrode 554. As focused on the left side, a left complementary shielding structure, such as composed of complementary shielding layers 509A and 519A, is formed between the signal line 500A and the stripe shielding layer 551A to prevent light leakage therebetween. The left complementary shielding structure also can be an isolated shielding structure 529 overlapping the stripe shielding layer 551A and the signal line 500A (as shown in FIG. 8), a shielding structure 509' overlapping the signal line 500A and contacting the stripe shielding layer 551A (as shown in FIG. 9), a shielding structure 519' overlapping the stripe shielding layer 551A and contacting the signal line 500A (as shown in FIG. 10), or two sub-structures respectively contacting the stripe shielding layer 551A and the signal line 500A. The latter is described in this embodiment and figures.

As shown in FIGS. 1 and 2B, the left complementary shielding structure is composed of the complementary shielding layers 509A and 519A. The complementary shielding layer 509A contacts the stripe shielding layer 551A and the complementary shielding layer 519A contacts the signal line 500A, which overlap each other. The right complementary shielding structure is composed of the complementary shielding layers 509B and 519B. The complementary shielding layer 509B contacts the stripe shielding layer 551B and the complementary shielding layer 519B contacts the signal line 500B, which overlap each other.

The complementary shielding layers 509A, 509B, 519A and 519B are complementary in the context that they are designed to overlap with certain fishbone-shaped spacings in a main shielding structure 559 formed in the upper substrate 562.

The upper substrate 562 comprises the transparent common electrode 563, the main shielding structure 559 and the color filter 560 of R (red), G (green) and B (blue), which are the three primary colors. In FIG. 2A-2C, the sub-filter R is shown in the pixel area as an example.

The main shielding structure 559 disposed on the transparent substrate 558 is shown in FIGS. 3 and 4 with several pixel areas. The material used to form the main shielding structure 559 can be any light shielding material, such as metal or resin. The main shielding structure 559 is composed of a plurality of fishbone-shaped shielding elements 559A that are physically separated from each other by fishbone-shaped spacings 508 and parallel in direction X. Each fishbone-shaped shielding element 559A includes a central bar 559B extending in direction X and covering the scan line 501 and a plurality of branches 559C perpendicularly extending from two sides of the central bar 559B. The fishbone-shaped spacings 508 include a plurality of gaps 508S and main spacings 508L. Each gap 508S is the nearest area between the adjacent branches 559C belonging to two adjacent fishbone-shaped shielding elements 559A. The gap 508S provides a space to prevent the main shielding structure 559 from accumulating local stress while the main shielding structure 559 is compressed or strained during fabrication. This separation of the fishbone-shaped shielding elements 559A provides a space to prevent the thermal stress across the entire LCD panel during fabrication of the upper substrate 562.

Figure 6:
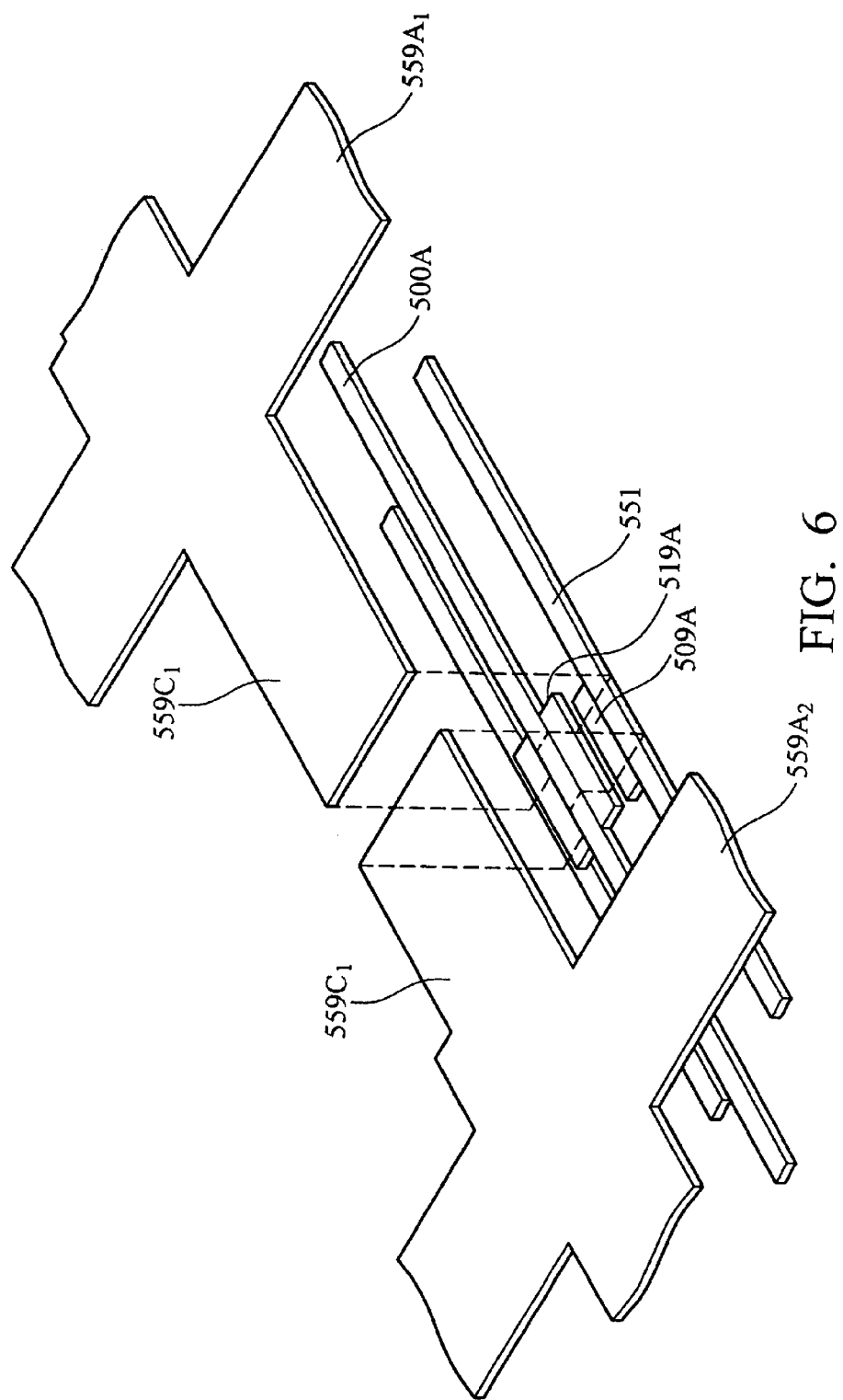
FIG. 6 is a 3-D view of stripe shielding layers and fishbone-shaped shielding elements between two adjacent display pixels.

In order to provide a more detailed description, FIGS. 1 and 5 show a pixel area. The fishbone-shaped shielding elements 559A are further referred to as 559A$_1$ and 559A$_2$, the branches 559C are further referred to as 559C$_1$ and 559C$_2$, and the gaps 508S are further referred to as 508S$_1$ and 508S$_2$. FIG. 5 shows only parts of two adjacent fishbone-shaped shielding elements 559A$_1$ and 559A$_2$ that define a light-transmission pixel area 508L, which is one of the main spacings of the fishbone-shaped spacings 508, corresponding to the pixel electrode 554 in the lower substrate 561. The fishbone-shaped shielding elements 559A$_1$ and 559A$_2$ are separated by the fishbone-shaped spacing 508, in which the main spacing 508L corresponding to the main portion of the pixel electrode 554 is defined by the two adjacent branches 559C$_1$ and 559C$_2$ of the fishbone-shaped shielding element 559A$_1$ and the two adjacent branches 559C$_1$ and 559C$_2$ of the fishbone-shaped shielding element 559A$_2$. Within the pixel area, the left branches 559C$_1$ overlap a portion of the signal line 500A and the right branches 559C$_2$ overlap a portion of the signal line 500B, thus the left gap 508S$_1$ exposes a portion of the left signal line 500A and the right gap 508S$_2$ exposes a portion of the right signal line 500B. The left complementary shielding layers 509A and 519A correspond to the gap 508S$_1$ and are partially overlapping the branches 559C$_1$, as shown in FIG. 6. The right complementary shielding layers 509B and 519B correspond to the gap 508S$_2$ and are partially overlapping the branches 559C$_2$.

The stripe shielding layers 551B and 551B and the complementary shielding layers 509A and 509B are disposed at a level lower than the signal lines 500A and 500B. For example, the stripe shielding layers 551A and 551B and the complementary shielding layers 509A and 509B are formed with the scan lines 501A and 501B and from a first metal layer (M1), and the signal lines 500A and 500B and the complementary shielding layers 519A and 519B are formed from a second metal layer (M2). After the stripe shielding layers 551A and 551B, the complementary shielding layers 509A and 509B and the scan lines 501A and 501B are formed in the first metal layer (M1), a gate insulating layer 555 is formed thereon, covering the first metal layer (M1). The signal lines 500A and 500B and the complementary shielding layers 519A and 519B are then formed in the second metal layer (M2) deposited on the gate insulating layer 555. A passivation layer 550 is then formed before forming the pixel electrode 554.

Figure 7:
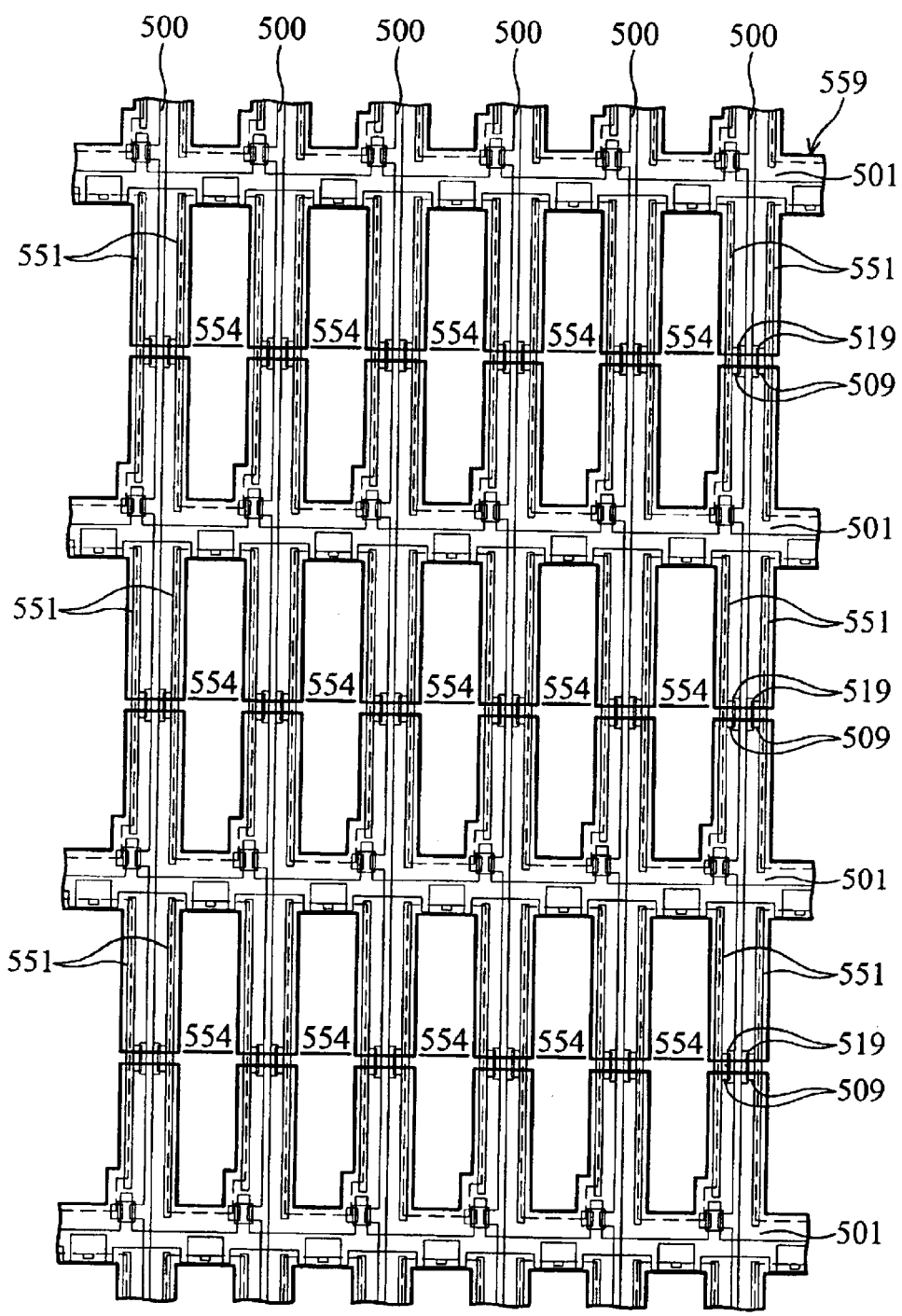
FIG. 7 is a plane view of multiple adjacent display pixel regions of a liquid crystal display according to the first embodiment of the present invention.

Now turning to several pixel areas as shown in FIG. 7, the light shielding structure comprises the main shielding structure 559, the stripe shielding layers 551 and the complementary shielding layers 509 contact the stripe shielding layers 551, and the complementary shielding layers 519 contact the signal line 500.

The main shielding structure 559 allows transmission of light passing through the pixel electrode 554 and operates in combination with the stripe shielding layers 551, the complementary shielding layers 509 and 519 to block light that does not pass through the corresponding pixel electrode 554.

Second Embodiment

In the second embodiment a specific example of a transmissive type liquid crystal display with TFT as the driving element is given in the following detailed description.

Figure 11:
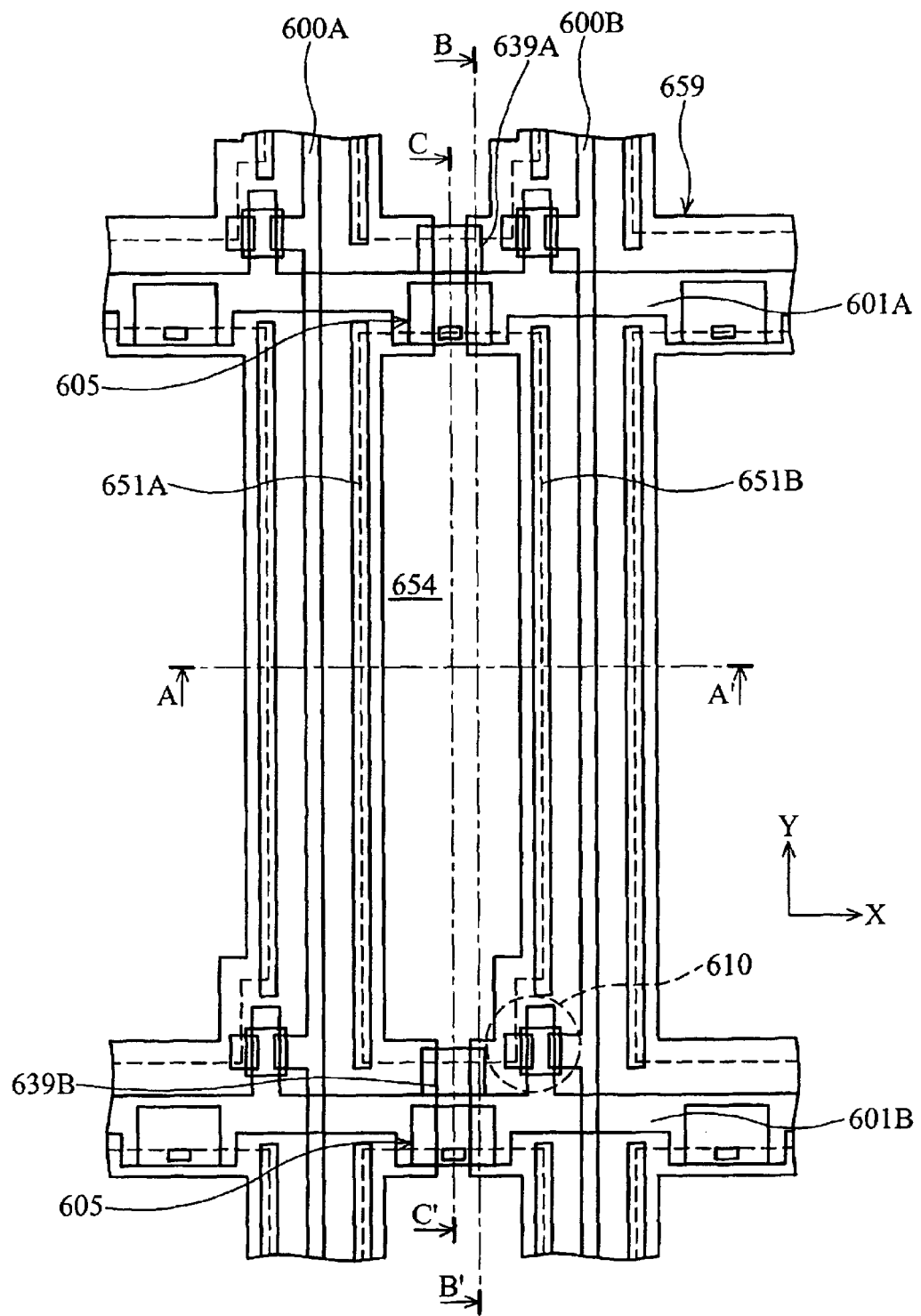
FIG. 11 is a plane view of a pixel region of a liquid crystal display according to the second embodiment of the present invention.
Figure 12A:
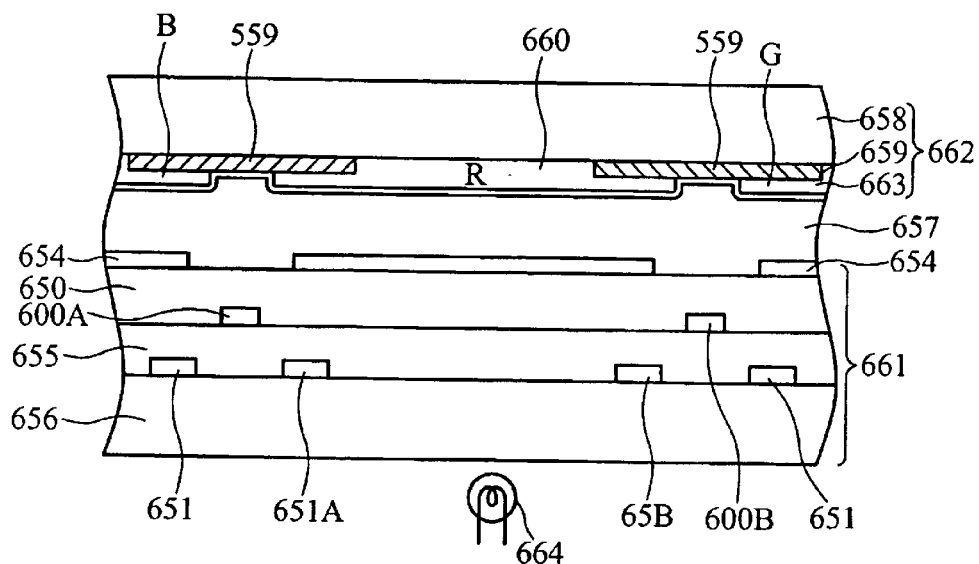
FIG. 12A is a cross section taken along cut line A-A' of FIG. 11.
Figure 12B:
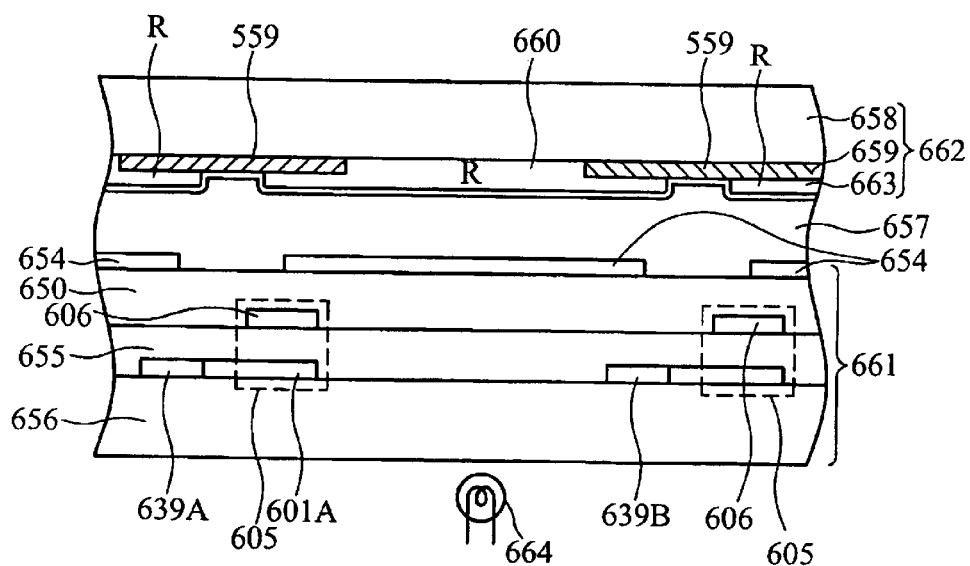
FIG. 12B is a cross section taken along cut line B-B' of FIG. 11.
Figure 12C:
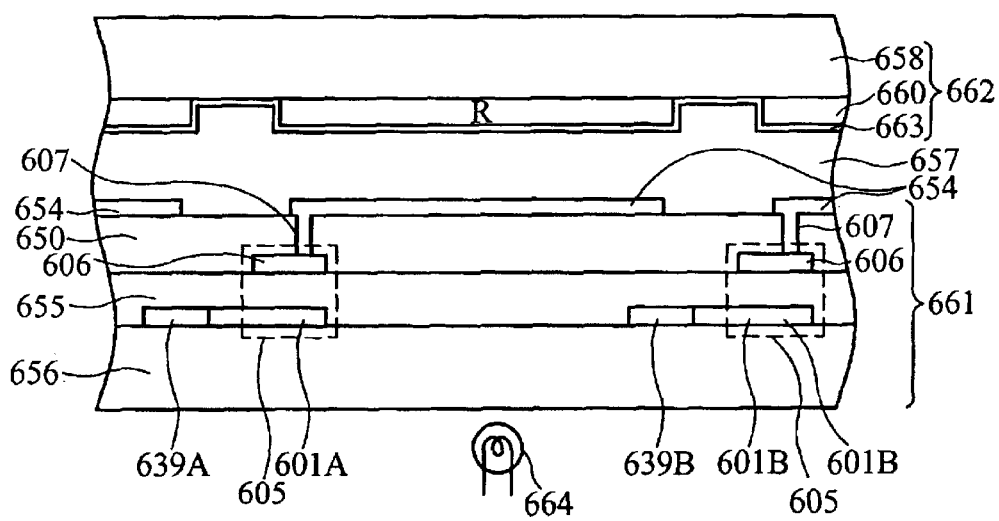
FIG. 12C is a cross section taken along cut line C-C' of FIG. 11.
Figure 14:
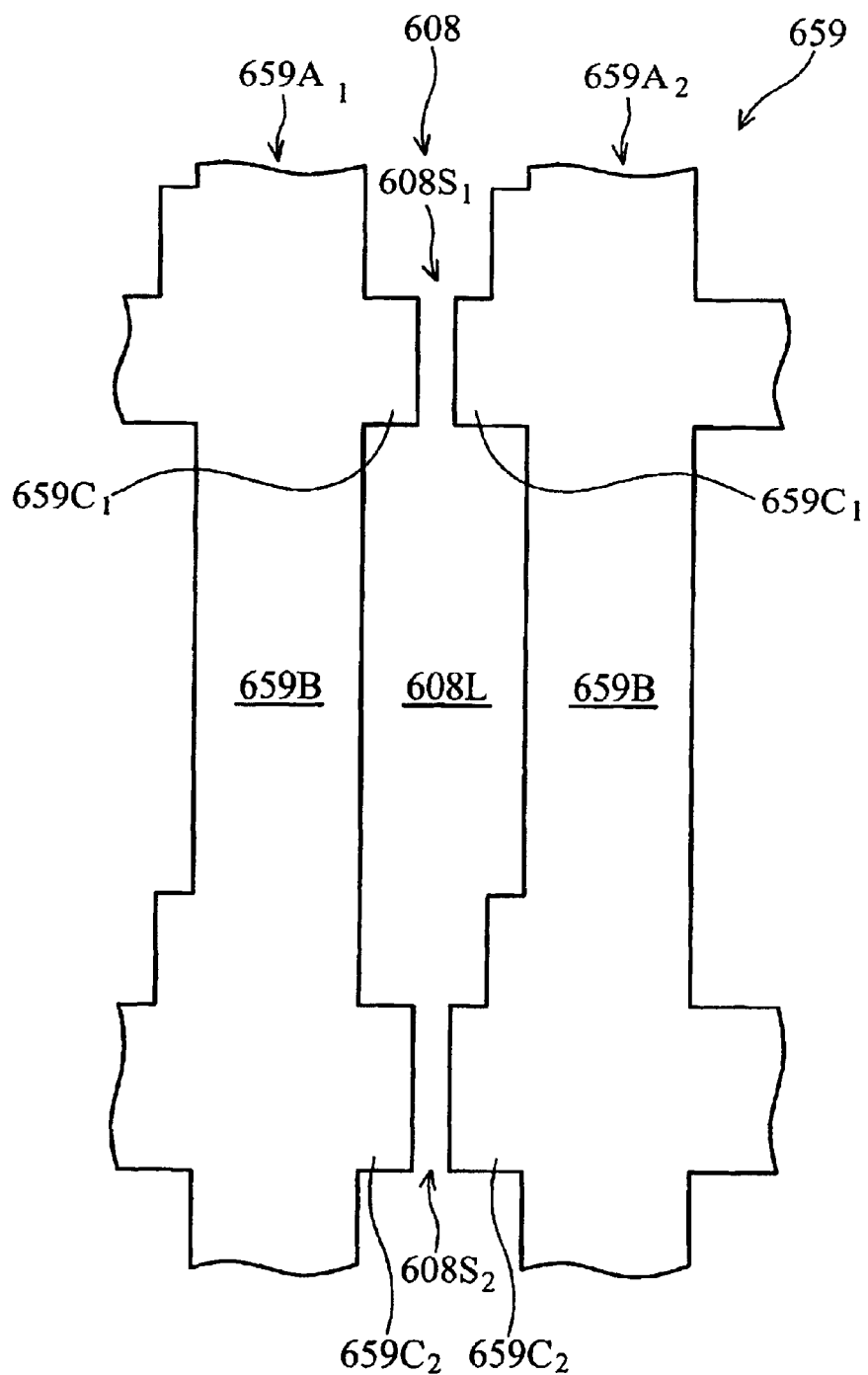
FIG. 14 is a plane view showing only parts of two adjacent fishbone-shaped shielding elements disposed on an upper transparent substrate in the pixel region of FIG. 11.

FIG. 11 is a plane view of a pixel region of a liquid crystal display according to the second embodiment of the present invention. FIGS. 12A, 12B and 12C are cross sections taken along cut line A-A', B-B' and C-C' of FIG. 11, respectively. FIG. 14 is a plane view showing only parts of two adjacent fishbone-shaped shielding elements disposed on an upper transparent substrate in the pixel region of FIG. 11.

Figure 13:
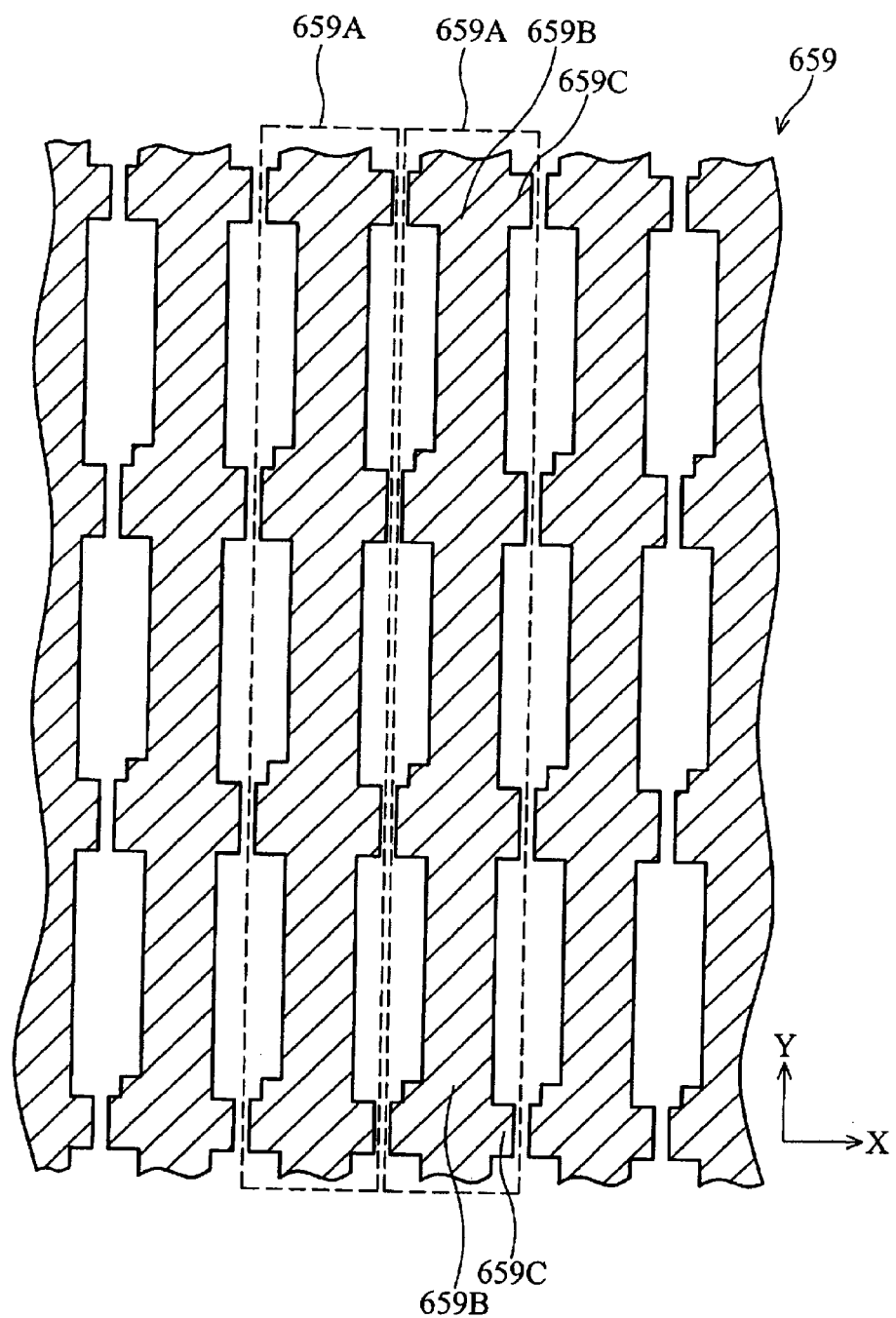
FIG. 13 is a plane view of fishbone-shaped shielding elements on an upper substrate for multiple adjacent display pixels according to the second embodiment of the present invention.
Figure 15:
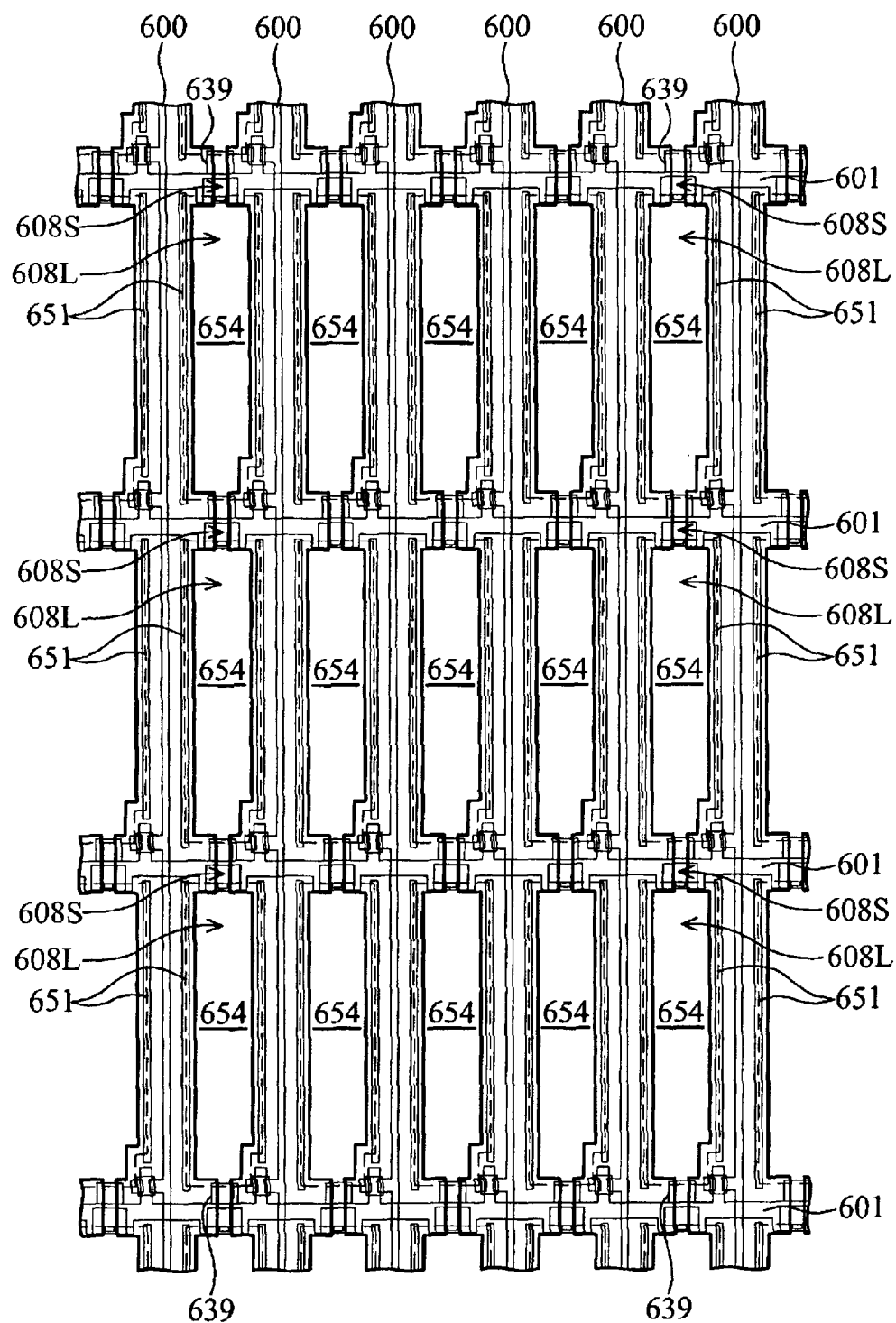
FIG. 15 is a plane view of multiple adjacent display pixel regions of a liquid crystal display according to the second embodiment of the present invention.

FIG. 13 is a plane view of fishbone-shaped shielding elements on an upper substrate for multiple adjacent display pixels, and FIG. 15 is a plane view of a liquid crystal display comprising a light shielding structure for multiple adjacent display pixels.

As shown in FIGS. 12A–12C, the liquid crystal display comprises an upper substrate 662, a lower substrate 661 and a liquid crystal 657 sealed in a space between the upper substrate 662 and the lower substrate 661. An illumination source 664 is placed behind the lower substrate 661.

As shown in FIGS. 11 and 12A–12C, for one pixel area the lower substrate 661 comprises a lower transparent substrate 656, a TFT 610, scan lines 601A and 601B extending in direction X, signal lines 600A and 600B extending in direction Y, a pixel electrode 654 as shown with dashed line, stripe-shaped shielding layers 651A and 651B and complementary shielding layers 639A and 639B. The scan lines 601A and 601B and the signal lines 600A and 600B define a pixel area, and a pixel electrode 654 shown in FIG. 11 with dashed line is formed in the main portion of the pixel area. The pixel electrode 654 is controlled by the TFT 610 which is substantially formed by the scan line 601B and the signal line 600B at one corner of the electrode area. A bottom electrode of the capacitor 605 is formed adjacent to the scan lines 601A and 601B, and an upper electrode 606 of the capacitor 605 is formed to be connected to the pixel electrode 654 through the opening 607 in the passivation layer 650.

As for the lower substrate 661, the left stripe shielding layer 651A is formed between the left signal line 600A and the pixel electrode 654 to partially overlap the periphery of the pixel electrode 654. Also, the right stripe shielding layer 651B is formed between the right signal line 600B and the pixel electrode 654 to partially overlap the periphery of the pixel electrode 654. A capacitor electrode 639A working with the shown pixel electrode 654 is formed with the scan line 601A and partially overlaps the pixel electrode 654, so as to prevent light leakage between the scan line 601A and the pixel electrode 654. A complementary shielding structure, for example, composed of complementary shielding layer 639B contacting the scan line 601B is formed between the scan line 601B and the pixel electrode 654 to prevent light leakage therebetween. Another complementary shielding layer 639A is formed to prevent light leakage between the scan line 601A and the upper pixel electrode 654 of which only parts are shown.

The complementary shielding structure also can be an isolated structure overlapping the pixel electrode 654 and the scan line 601B.

As shown in FIGS. 11, 12A and 12B, the complementary shielding structure is composed of the complementary shielding layers 639A and 639B which contact the scan lines 601A and 601B respectively and overlap their corresponding pixel electrodes 654.

The complementary shielding layers 639A and 639B are complementary in the context that they are designed to overlap certain fishbone-shaped spacings in a main shielding structure 659 formed in the upper substrate 662.

The upper substrate 662 comprises the transparent common electrode 663, the main shielding structure 659 and the color filter 660 of R (red), G (green) and B (blue), which are the three primary colors. In FIG. 12A-12C, the sub-filter R is shown in the pixel area as an example.

The main shielding structure 659 disposed on the transparent substrate 658 is shown in FIG. 13 with several pixel areas. The material used to form the main shielding structure 659 can be any light shielding material, such as metal or resin. The main shielding structure 659 is composed of a plurality of fishbone-shaped shielding elements 659A that are physically separated from each other by fishbone-shaped spacings 608 and are parallel in direction Y. As shown in FIG. 15, each fishbone-shaped shielding element 659A includes a central bar 659B extending in direction Y, covering the signal line 600 and a plurality of branches 659C perpendicularly extending from two sides of the central bar 659B. The fishbone-shaped spacings 608 include a plurality of gaps 608S and main spacings 608L. Each gap 608S is the nearest area between the adjacent branches 659C belonging to two adjacent fishbone-shaped shielding elements 659A. The gap 608S provides a space to prevent the main shielding structure 659 from accumulating local stress while the main shielding structure 659 is compressed or strained during fabrication. This separation of the fishbone-shaped shielding elements 659A provides a space to prevent the stress from accumulating across the entire LCD panel.

Now turning to a pixel area shown in FIGS. 11 and 14, the fishbone-shaped shielding elements 659A are further referred to as $659A_1$ and $659A_2$, the branches 659C are further referred to as $659C_1$ and $659C_2$, and the gap 608S are further referred to as $608S_1$ and $608S_2$. FIG. 14 shows only parts of two adjacent fishbone-shaped shielding elements $659A_1$ and $659A_2$ that define a light-transmission pixel area 608L, which is one of the main spacings of the fishbone-shaped spacings 608, corresponding to the pixel electrode 654 in the lower substrate 661. The fishbone-shaped shielding elements $659A_1$ and $659A_2$ are separated by the fishbone-shaped spacing 608, in which the main spacing 608L corresponding to the main portion of the pixel electrode 654 is defined by the two adjacent branches $659C_1$ and $659C_2$ of the fishbone-shaped shielding element $659A_1$ and the two adjacent branches $659C_1$ and $659C_2$ of the fishbone-shaped shielding element $659A_2$. Within the pixel area, the upper branches $659C_1$ overlap a portion of the scan line 601A and the lower branches $659C_2$ overlap a portion of the scan line 601B, thus the upper gap $608S_1$ exposes a portion of the upper scan line 601A and the lower gap $608S_2$ exposes a portion of the lower scan line 601B. The complementary shielding layers 639A and 639B correspond to the gaps $608S_1$ and $608S_2$ and partially overlap the branches $659C_1$ and $659C_2$ respectively as shown in FIGS. 11 and 14.

For example, the stripe shielding layers 651A and 651B and the complementary shielding layers 639A and 639B are formed with the scan lines 601A and 601B and from a first metal layer (M1), and the signal lines 600A and 600B and the upper capacitor electrodes 606 are formed from a second metal layer (M2). After the stripe shielding layers 651A and 651B, the complementary shielding layers 639A and 639B, the bottom electrode of the capacitor 605 and the scan lines 601A and 601B are formed in the first metal layer (M1), an insulating layer 655, such as silicon nitride, silicon oxide or the same, is deposited thereon, covering the first metal layer (M1). The signal lines 600A and 600B and the upper electrode 606 of the capacitor 605 are then formed in the second metal layer (M2) deposited on the insulating layer 655. A passivation layer 650, such as silicon nitride, silicon oxide or the same, is then formed before forming the pixel electrode 654.

Now turning to several pixel areas shown in FIG. 15, the light shielding structure comprises the main shielding structure 659, the stripe shielding layers 651 and the complementary shielding layers 639 contacting the scan lines 601.

The main shielding structure 659 allows transmission of light passing through the pixel electrode 654 and operates in combination with stripe shielding layers 651, the complementary shielding layers 639 to block light that does not pass through the corresponding pixel electrode 654.

Third Embodiment

As shown in FIGS. 7 and 15, the incident light passing through the gaps 508S and 608S in the main shielding structure 559 and 659 is blocked by the complementary shielding structures disposed on different levels. The gaps 508S and 608S provide a space to prevent stress across the entire LCD panel.

Figure 16:
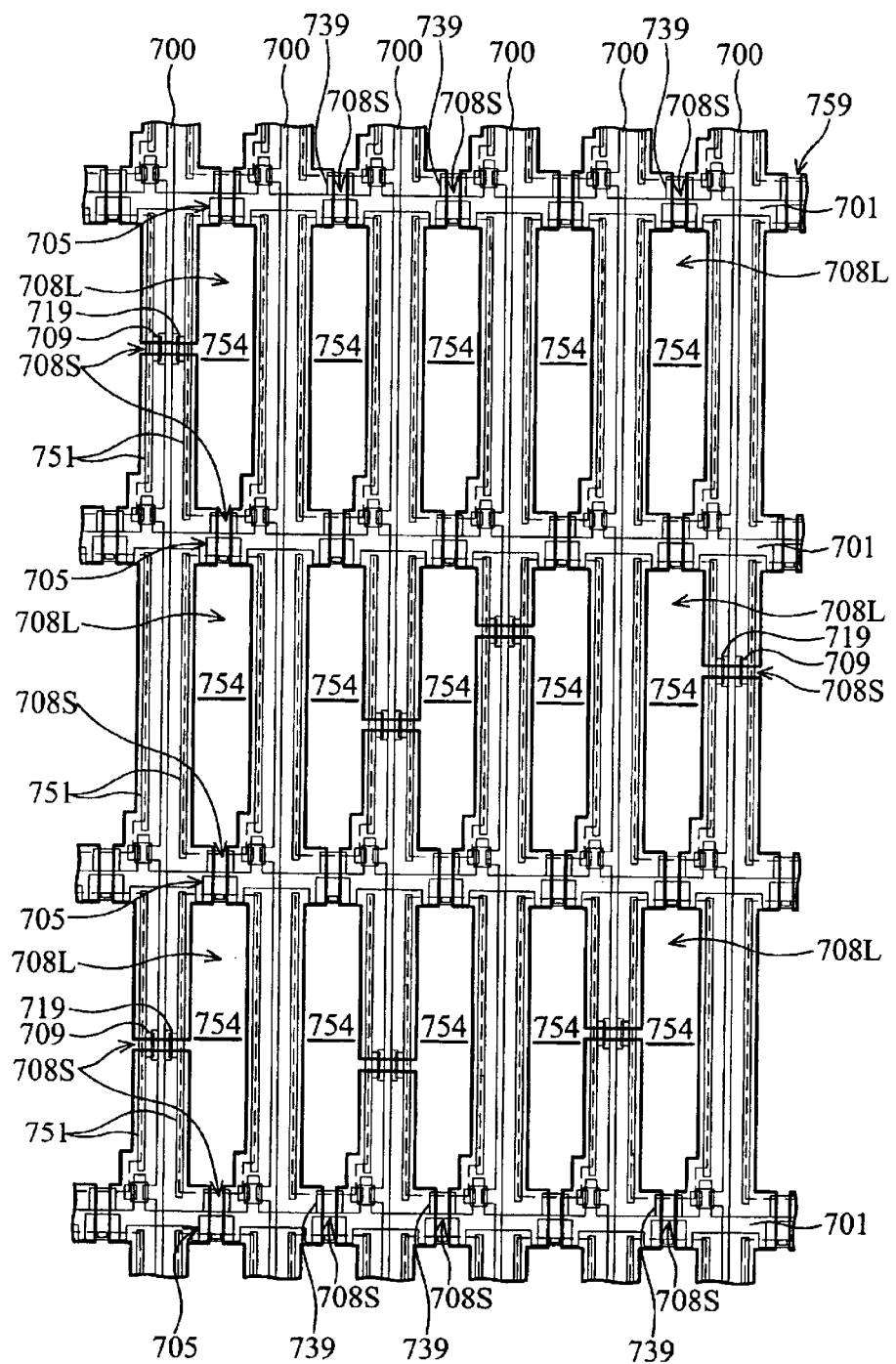
FIG. 16 is a plane view of multiple adjacent display pixel regions of a liquid crystal display according to the third embodiment of the present invention.

Referring to FIG. 16, in the third embodiments, the gaps 708S are randomly disposed over the scan lines 701 and signal lines 700. Each main spacing 708L corresponding to the pixel electrode 754 shown with dashed line is connected to at least one gap 708S disposed over the scan lines 701 or signal lines 700 to be connected to the adjacent main spacing 708L through the gap 708S.

If the gaps 708S in the main shielding structure 759 are disposed over the scan lines 701 and the capacitor 705, the complementary shielding layers 739 are disposed under the main shielding structure 759, for example, the complementary shielding layers 739 extend from the scan lines 701 to block the light passing through the gaps 708S.

If the gaps 708S in the main shielding structure 759 are disposed over the signal lines 700, the complementary shielding structure, such as complementary shielding layers 709 and 719 extending from the stripe-shaped shielding layers 751 and the signal lines 700 respectively, are disposed under the main shielding structure 759 to block the light passing through the gaps 708S.

Fourth Embodiment

In the fourth embodiment a specific example of an in-plane switching mode liquid crystal display (IPS-LCD) having the characteristic of wide viewing angle is given, and a detailed description is given hereinafter.

Figure 17:
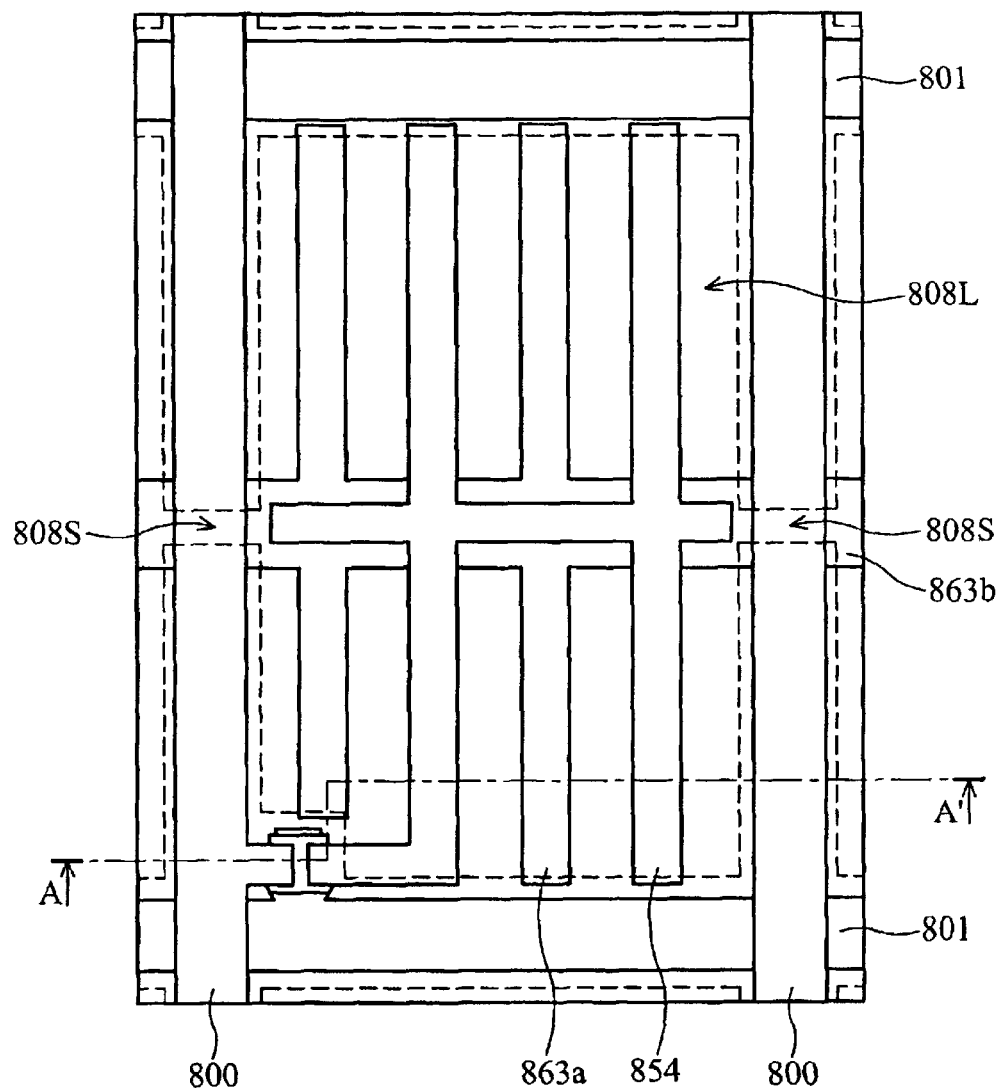
FIG. 17 is a plane view of a unit pixel of an IPS-LCD.
Figure 18:
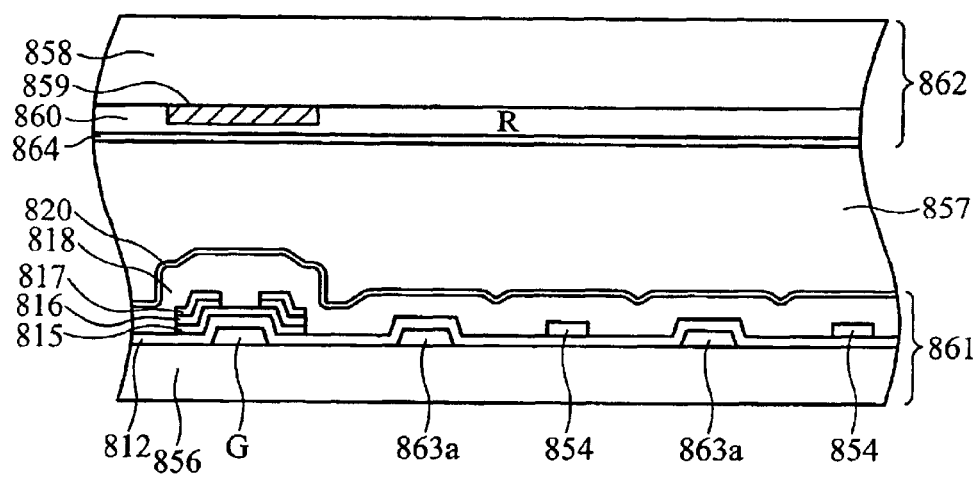
FIG. 18 is a cross section according to line A-A' of FIG. 17.
Figure 19:
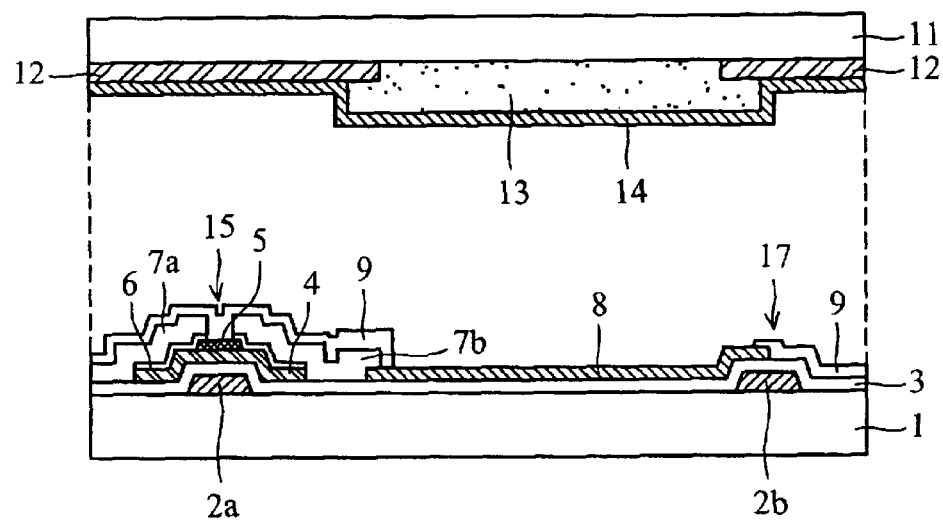
FIG. 19 is a cross section showing a conventional thin film transistor liquid crystal display (TFT LCD)
Figure 20:
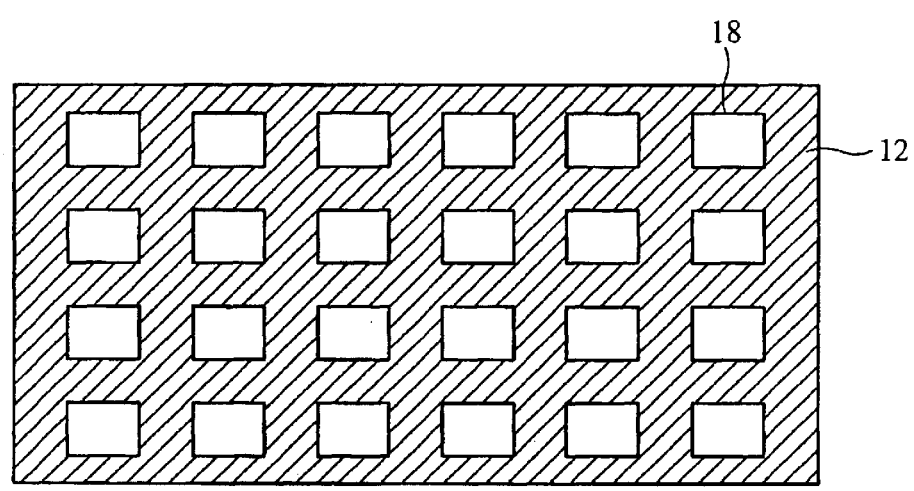
FIG. 20 is a top view of a conventional black matrix.

FIG. 17 is a plane view of a pixel unit of the IPS-LCD. As shown in FIG. 17, a pixel unit region is defined by the signal lines 800 and the scan lines 801. A common electrode line 863b is arranged parallel to the scan lines 801 in the pixel area. A thin film transistor (TFT) is formed adjacent to a cross point of the signal line 800 and the scan line 801. The TFT, as shown in FIG. 18 which is a sectional view according to line A-A' of FIG. 17, includes a gate electrode G, a gate insulator 812, a semiconductor layer 815, a channel layer 816, and source/drain electrode 817. The gate electrode G is connected to the scan line 801 and source/drain electrode 817 is connected to the signal lines 800. The gate insulator 812 is formed on the entire surface of the lower transparent substrate 856.

A common electrode 863a and a data electrode 854 are formed in the pixel area. The common electrode 863a is formed with the gate electrode G and connected to the common electrode line 863b. The date electrode 854 is formed with the source/drain electrode 817 and electrically connected to the source/drain electrode 817. Further, a passivation layer 818 and a lower alignment layer 820 are deposited on the whole surface of the lower transparent substrate 856.

On an upper transparent substrate 858, a main shielding structure 859 is formed to prevent light leakage generated around the TFT, the signal lines 800 and the scan line 801. Within the pixel area, a main spacing 808L and two gaps 808S define the main shielding structure 859 and several sub-structures, in which the gaps 808S are disposed over the common electrode line 863b to block the light passing through the gaps 808S. Put simply, the complementary shielding structure used to block the light passing through the gaps 808S is the body of the common electrode line 863b and is formed with opaque material. Therefore, no additional auxiliary structure is required to block the passing light.

These gaps 808S provide a space to prevent stress across the entire LCD panel, thus preventing peeling in the color filter layer 860, formation of which is described in the following.

A color filter layer 860, and an upper alignment layer 864 are formed on the main shielding structure 859 in sequence. Also, a liquid crystal layer 857 is formed between the lower substrate 861 and the upper substrate 862.

The foregoing description of the preferred embodiments of this invention has been presented for purposes of illustration and description. Obvious modifications or variations are possible in light of the above teaching. The embodiments are chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A flat panel display, comprising:
   a plurality of scan lines and a plurality of signal lines intersecting to define a plurality of pixel regions;
   a main shielding structure having a plurality of main spacings substantially corresponding to the pixel regions and a plurality of gaps, wherein each gap substantially corresponds to one of the scan lines or signal lines, each main spacing is connected to at least one of the gaps, and each gap is connected to two adjacent main spacings; and
   a plurality of complementary shielding structures corresponding to the gaps.

2. The flat panel display of claim 1, further comprising a plurality of pixel electrodes disposed in the pixel regions.

3. The flat panel display of claim 2, wherein a plurality of stripe-shaped shielding layers are disposed between the signal lines and the pixel electrodes and overlapping the pixel electrodes and the main shielding structure.

4. The flat panel display of claim 3, wherein
   a first portion of the complementary shielding structures correspond to a first portion of the gaps substantially corresponding to the signal lines and comprise a plurality of first complementary shielding layers partially overlapping the signal lines and the main shielding structure and contacting the stripe-shaped shielding layers; and
   a second portion of the complementary shielding structures correspond to a second portion of the gaps substantially corresponding to the scan lines and comprise a plurality of second complementary shielding layers partially overlapping the pixel electrodes and the main shielding structure and contacting the scan lines.

5. The flat panel display of claim 4, further comprising a plurality of capacitors adjacent to the scan lines and corresponding to the second portion of the gaps.

6. The flat panel display of claim 3, wherein
   a first portion of the complementary shielding structure correspond to a first portion of the gaps substantially corresponding to the signal lines and comprise a plurality of third complementary shielding layers partially overlapping the stripe-shaped shielding layers partially overlapping the stripe-shaped shielding layers and the main shielding structure and contacting the signal lines; and
   a second portion of the complementary shielding structure correspond to a second portion of the gaps substantially corresponding to the scan lines and comprise a plurality of second complementary shielding layers partially overlapping the pixel electrodes and the main shielding structure and contacting the scan lines.

7. The flat panel display of claim 6, further comprising a plurality of capacitors adjacent to the scan lines and corresponding to the second portion of the gaps.

8. The flat panel display of claim 3, wherein
   a first portion of the complementary shielding structure correspond to a first portion of the gaps substantially corresponding to the signal lines and comprise a plurality of first and third complementary shielding layers overlapping each other, the first complementary shielding layers partially overlap the signal lines and the main shielding structure and contacting the stripe-shaped shielding layers, the third complementary shielding layers partially overlap the stripe-shaped shielding layers and the main shielding structure and contacting the signal lines; and a second portion of the complementary shielding structure corresponds to a second portion of the gaps substantially corresponding to the scan lines and comprise a plurality of second complementary shielding layers partially overlapping the pixel electrodes and the main shielding structure and contacting the scan lines.

9. The flat panel display of claim 8, further comprising a plurality of capacitors adjacent to the scan lines and corresponding to the second portion of the gaps.

10. The flat panel display of claim 3, wherein the complementary shielding structures correspond to the gaps substantially corresponding to the signal lines and comprise a plurality of first complementary shielding layers partially overlapping the signal lines and the main shielding structure and contacting the stripe-shaped shielding layers.

11. The flat panel display of claim 3, wherein the complementary shielding structure correspond to the gaps substantially corresponding to the signal lines and comprise a plurality of third complementary shielding layers partially overlapping the stripe-shaped shielding layers and the main shielding structure and contacting the signal lines.

12. The flat panel of claim 3, wherein the complementary shielding structure correspond to the gaps substantially corresponding to the signal lines and comprise a plurality of first and third complementary shielding layers overlapping each other, the first complementary shielding layers partially overlap the signal lines and the main shielding structure and contacting the stripe-shaped shielding layers, the third complementary shielding layers partially overlap the stripe-shaped shielding layers and the main shielding structure and contacting the signal lines.

13. The flat panel display of claim 1, wherein the gaps substantially correspond to the scan lines, the main shielding structure comprises a plurality of fishbone-shaped layers physically separated from each other by a plurality of fishbone-shaped spacings and are parallel with the signals lines, each fishbone-shaped spacing is composed of the main spacings and the gaps.

14. The flat panel display of claim 1, wherein the gaps substantially correspond to the signal lines, the main shielding structure comprises a plurality of fishbone-shaped layers physically separated from each other by a plurality of fishbone-shaped spacings and are parallel with the scan lines, each fishbone-shaped spacing is composed of the main spacings and the gaps.

15. The flat panel display of claim 1, further comprising:
a plurality of common electrodes;
a pixel electrode disposed between the common electrodes; and
a common electrode line connected to the common electrodes and composed of opaque material;
wherein portions of the common electrode line under the gaps are the complementary shielding structures.

16. A flat panel display, comprising:
a first substrate including
a plurality of scan lines and a plurality of signal lines intersecting to define a plurality of pixel regions,
a plurality of pixel electrodes disposed in the pixel regions,
a plurality of stripe-shaped shielding layers disposed between the signal lines and the pixel electrodes and overlapping the pixel electrodes,
a plurality of complementary shielding structures;
a second substrate including
a main shielding structure having a plurality of main spacings substantially corresponding to the pixel regions and a plurality of gaps, wherein each gap substantially corresponds to one of the scan lines or signal lines, each main spacing is connected to at least one of the gaps, and each gap is connected to two adjacent main spacings,
a color filter disposed on the main shielding structure; and
a liquid crystal sealed between the first and the second substrates,
wherein the complementary shielding structures correspond to the gaps.

17. A flat panel display, comprising:
first and second scan lines parallel to each other in a first direction;
first and second signal lines parallel to each other in a second direction, wherein the first and second scan lines and the first and second signal lines define a pixel region;
a main shielding structure having a main spacing substantially corresponding to the pixel region and a gap to be connected to the main spacing and an adjacent main spacing; and
a complementary shielding structure disposed under the gap to partially overlap the main shielding structure.

18. The flat panel display of claim 17, wherein the gap is over the first scan line, a first pixel electrode is disposed under the main spacing, a second pixel electrode is disposed under the adjacent main spacing, the first and second pixel electrodes are controlled by the first signal line.

19. The flat panel display of claim 18, wherein a capacitor is adjacent to the first scan line and corresponds to the gap.

20. The flat panel display of claim 18, wherein a complementary shielding structure is adjacent to the first scan line.

21. The flat panel display of claim 17, wherein the gap is over the first signal line, a first pixel electrode is disposed under the main spacing, a second pixel electrode is disposed under the adjacent main spacing, the first and second pixel electrodes are controlled by the first scan line.

22. The flat panel display of claim 21, further comprising
first and second stripe-shaped layers at both sides of the first signal line; and
first and second complementary shielding layers constituting the complementary shielding structure to partially overlap the first signal line and the main shielding structure and contact the first and second stripe-shaped shielding layer respectively.

23. The flat panel display of claim 21, further comprising
first and second stripe-shaped layers at both sides of the first signal line; and
first and second complementary shielding layers constituting the complementary shielding structure to partially overlap the first and second stripe-shaped layer and the main shielding structure and contact the first signal line.

24. The flat panel display of claim 21, further comprising
first and second stripe-shaped layers at both sides of the first signal line; and
first, second, third and fourth complementary shielding layers constituting the complementary shielding structure, wherein the first and second complementary shielding layers overlap the main shielding structure and contact the first and second stripe-shaped shielding layer respectively, the third and fourth complementary shielding layers overlap the main shielding structure and contact the first signal line, and the first and second complementary shielding layers overlap the third and fourth complementary shielding layers.

* * * * *